United States Patent [19]

Hulsizer et al.

[11] Patent Number: 4,716,271
[45] Date of Patent: Dec. 29, 1987

[54] APPARATUS FOR POSITIONING A TOOL WITH RESPECT TO A CYLINDRICAL WORK PIECE

[75] Inventors: Philip N. Hulsizer; John H. Dahl, both of Atlanta, Ga.

[73] Assignee: Welding Services, Inc., Atlanta, Ga.

[21] Appl. No.: 655,946

[22] Filed: Sep. 28, 1984

[51] Int. Cl.⁴ ............................................. B23K 9/225
[52] U.S. Cl. ............................. 219/125.11; 219/60 R; 228/29; 266/56; 266/71
[58] Field of Search ................. 219/59.1, 60 R, 62, 219/125.11; 266/71, 56; 228/29

[56] References Cited

U.S. PATENT DOCUMENTS

| | | | |
|---|---|---|---|
| 2,408,517 | 10/1946 | Howard | 266/56 |
| 4,007,705 | 2/1977 | Sherer et al. | 266/56 |
| 4,051,342 | 9/1977 | Stubbings | 266/56 |
| 4,145,593 | 3/1979 | Merrick et al. | 219/125.11 |
| 4,559,430 | 12/1985 | Hayakawa | 219/125.11 |

Primary Examiner—Clifford C. Shaw
Attorney, Agent, or Firm—Jones, Askew & Lunsford

[57] ABSTRACT

An apparatus for circumferentially and longitudinally positioning a weld head or other tool with respect to the surface of a pipe. A first annular ring is affixed to the pipe. A longitudinally movable annular indexing track is also circumferentially fitted about the pipe and rides upon a plurality of support rods mounted to the indexing track. The support rods are slidably received within corresponding holes in the clamping ring and extend longitudinally and parallel to the outer surface of the pipe. A motor mounted to the fixed ring drives a ring gear concentric to the fixed ring to reciprocate a ball screw which moves the second longitudinally moveable ring toward and away from the fixed ring. An orbitally moveable third annular ring is circumferentially mounted to the second ring, and a second motor mounted to the fixed ring drives a telescoping drive shaft which rotates the orbital third ring. Thus, a weld head or other tool attached to the third ring is both longitudinally and circumferentially positionable with respect to the surface of the pipe.

8 Claims, 11 Drawing Figures

APPARATUS FOR POSITIONING A TOOL WITH RESPECT TO A CYLINDRICAL WORK PIECE

TECHNICAL FIELD

The present invention relates generally to an apparatus for positioning a tool with respect to an elongate cylindrical workpiece, and more particularly to an apparatus providing both circumferential and longitudinal movement of a tool for welding, cutting, and inspecting pipes and the like.

BACKGROUND OF THE INVENTION

With the advent of nuclear powerplants, new problems arose with respect to the welding, inspection, and repair of pipes. In addition to the need for highly accurate welds, it is often necessary to weld and inspect pipes in areas which are contaminated by dangerous levels of radioactivity. Accordingly, there arose a need for an apparatus which is capable of positioning and operating a welding head or inspection device by remote control and which can provide precision positioning of a tool with respect to a workpiece.

The broad concept of a carriage mounted to travel along an elevated track for transporting a welding head along a circumferential welding track is well known in the art. Typically, however, many self-propelled carriages known in the art suffer the disadvantage of binding in the track and of traveling more slowly as the tool carriage moves upward on the track than when it moves downward on the track, disadvantages which can result in uneven welds and increased maintenance demands.

One such circumferentially-moving apparatus is shown in U.S. Pat. No. 3,621,183, which discloses a butt-welding machine for metal sheets or large-diameter pipes. The apparatus comprises a rail or track which is mounted to one of the workpieces in parallel relation to the gap between the workpieces. A self-propelled carriage is mounted on the track for supporting and oscillating a welding head transversely with respect to the weld. As the carriage moves along the rail, the weld head is reciprocated in a direction perpendicular to the weld by means of a motor and reduction gear unit. The electrode oscillates constantly from one edge to the other of the gap which the weld head tracks, and the amplitude of oscillation is automatically controlled so that the path described by the electrode is always situated between the edges of the two sheets or pipes being joined, even if the gap between them is irregular, and even if the rail supporting the weld head carriage is not exactly parallel to the gap. However, this apparatus provides only for motion along the gap between the workpieces and for oscillation within the gap, and does not provide for movement perpendicular to the gap between the workpiece.

A different approach to positioning a tool is shown in U.S. Pat. No. 3,665,148, which discloses an apparatus utilizing electric servo motors and ball screw drives for correct positioning of a tool with respect to the workpiece. The apparatus comprises an automated six-axis manipulator for repetitively positioning a tool along the primary coordinate axes to achieve accurate work processing relationship with an article moving along an assembly line. While the use of electric servo motors and ball screw drives to position the tool is of interest, the tool manipulator disclosed in this patent is not readily adaptable to circumferential welding of a pipe.

U.S. Pat. No. 3,532,807 discloses an automatic welding apparatus with a track and moveable carriage, which uses an automatic closed circuit television arc guidance control system. However, the patent does not disclose an arrangement for achieving longitudinal motion, and it further does not address the problems peculiar to pipe welding applications.

Accordingly, there is a need in the art for an a tool positioning apparatus which provides for both circumferential and longitudinal indexing of a tool with respect to a pipe.

SUMMARY OF THE INVENTION

As will be seen, the apparatus of the present invention overcomes these and other problems associated with conventional traveling welding carriages which are limited to circumferential movement. Stated generally, the present invention comprises an apparatus which permits circumferential and longitudinal positioning of a tool such as a weld head or inspection device along a cylindrical workpiece.

Stated somewhat more specifically, the apparatus of the preferred embodiment comprises a fixed circumferential clamping ring which is mounted on the workpiece pipe. A longitudinally movable annular indexing track is also circumferentially fitted about the pipe and rides upon a plurality of support rods mounted to the indexing track. The support rods are slidably received within corresponding holes in the clamping ring and extend longitudinally and parallel to the outer surface of the pipe. A first electric motor mounted on the clamping ring is geared to drive a concentric ring gear rotating around the clamping ring. The ring gear drives ball screw nuts mounted in the clamping ring which cause ball screws connected to the indexing track to reciprocate, thereby moving the indexing track longitudinally toward and away from the fixed clamping ring.

An orbitally moveable torch mounting ring is circumferentially fitted about the longitudinally movable indexing track to provide for perimetral movement around the pipe. A second motor on the clamping ring turns a telescoping drive shaft which rotates a sprocket gear mounted within the indexing track that circumferentially rotates the outer torch mounting ring. A tool clamped to the circumferentially movable mounting ring is thereby carried by the longitudinally movable indexing track. The working tool can be a welding head, a cutting machine, an inspecting device such as a TV camera, or the like. Optical position encoders mounted to the two electric motors provide signals so that control circuitry will know the position of the working tool at all times. The apparatus will therefore index the tool longitudinally and will also rotate the tool circumferentially.

An alternate embodiment of the present invention comprises an apparatus for orbitally positioning a tool with respect to a workpiece. Stated more specifically, the alternate embodiment comprises a fixed clamping ring mounted to the pipe, and an outer orbital track mounted for rotation upon the fixed clamping ring. A weld head is attached to the outer orbital track for circumferential positioning of the tool with respect to the pipe.

This alternate embodiment achieves several advantages over the prior art carriage mounted to a circumferential track. First, the use of an annular track rotating around the fixed clamping ring instead of a carriage unit moving on a track distributes the weight of the tool and mount around the circumference of the pipe and affords a "flywheel" effect, which permits smoother travel and minimizes the speed variations experienced when a conventional carriage moves upward and downward on a circular track. Second, the use of an annular ring riding on ball bearings prevents the "binding" which frequently occurs in many conventional carriage arrangements. And, third, a plurality of tools can be mounted at various positions around the ring for different purposes, preventing the need to remove one tool to use another, and allowing the use of more than one tool concurrently.

Thus, it is an object of this invention to provide a tool positioning apparatus which provides for both longitudinal and circumferential movement of a tool about a pipe.

It is another object of this invention to provide a tool positioning apparatus which allows circumferential positioning of a tool without the speed variations and binding effects encountered with conventional tool carriages.

It is a further object of this invention to provide an automated tool positioning apparatus which automatically maintains track of the position of the tool as it is moved along the surface of the pipe.

It is another object of this invention to provide a tool positioning carriage which can be operated by remote control to position a tool with respect to the workpiece.

It is a further object of this invention to provide a tool positioning apparatus for use in nuclear powerplants which minimizes exposure of operators to radioactive contamination.

It is yet another object of this invention to provide a tool positioning apparatus which allows the use of a plurality of tools concurrently and eliminates the need to remove one tool in order to use another.

Other objects, features, and advantages of the present invention will become apparent upon reading the following specification when taken in conjunction with the drawing and the appended claims.

DETAILED DESCRIPTION OF THE DISCLOSED EMBODIMENT

Figure 1:
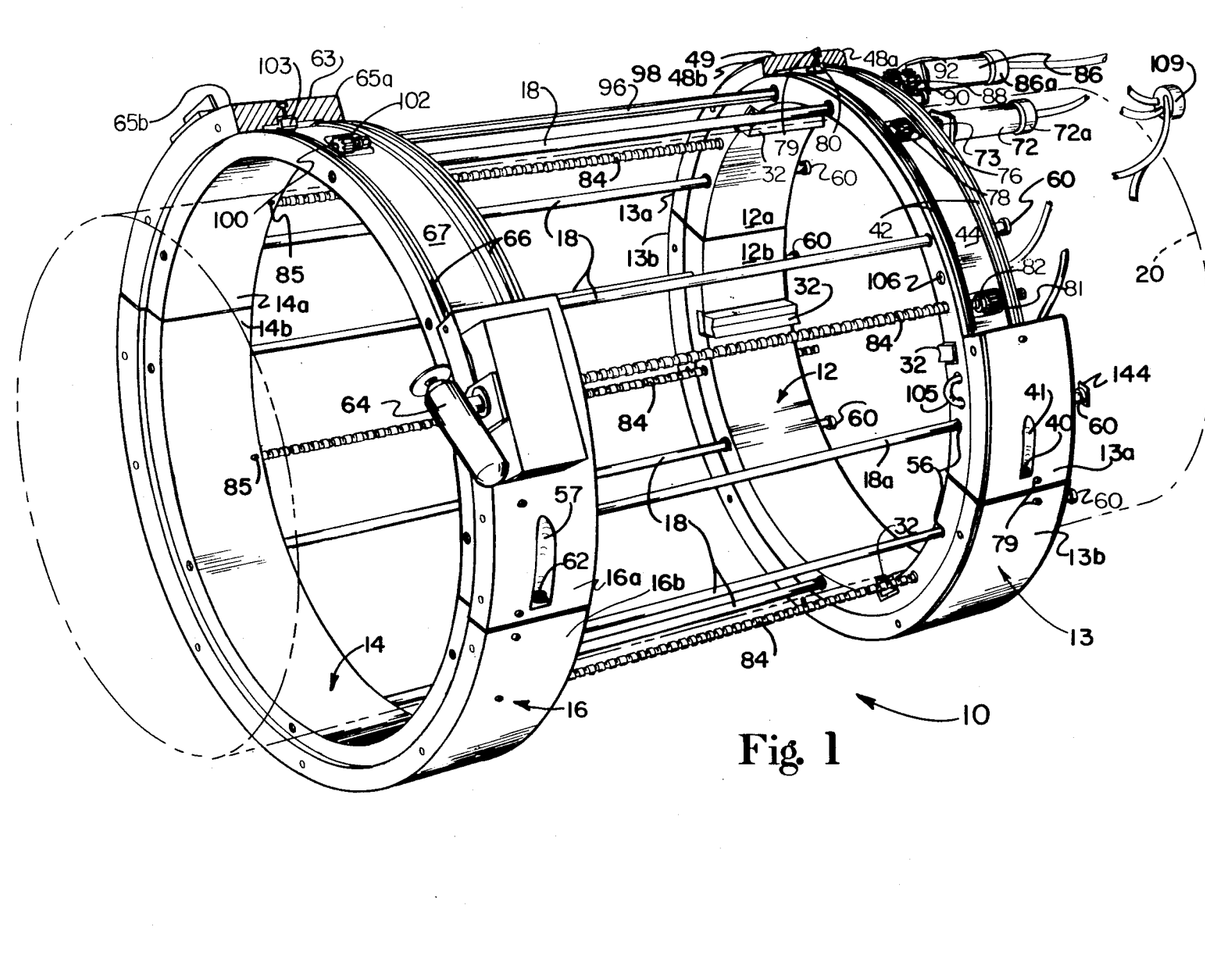
FIG. 1 is a partially cut-away perspective view of the preferred embodiment of the tool positioning apparatus in a longitudinally extended position.

Referring now in more detail to the drawings, in which like numerals indicate like elements throughout the several views, FIG. 1 shows a tool positioning apparatus 10 for mounting to a workpiece pipe 20 (shown in phantom), the apparatus comprising a fixed clamping ring 12, a ring gear 13 concentrically positioned on the clamping ring, a longitudinally movable indexing track 14, an orbitally moveable torch mounting ring 16 concentrically positioned on the indexing track, and a plurality of guide rods 18.

Figures 5, 5A, 5B:
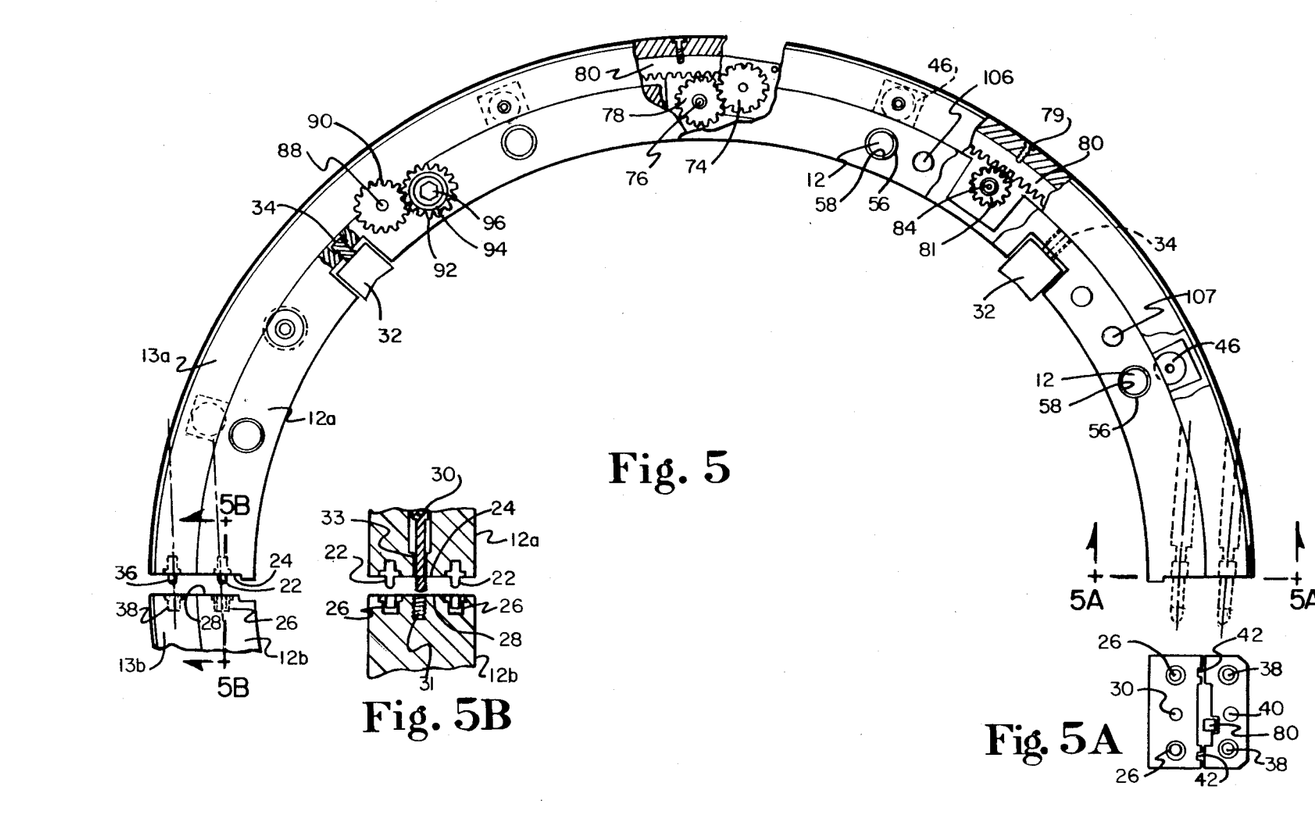
FIG. 5 is a side assembly view of the concentric ring gear half of the embodiment of FIG. 1 in place on a clamping ring half.
FIG. 5A is an end view of the assembly depicted in FIG. 5.
FIG. 5B is a partial cross-sectional view of the assembly depicted in FIG. 5.

The clamping ring 12 is an annular ring comprising two clamping ring halves 12a and 12b which are fitted together to form a unitary structure. As shown in FIG. 5B, alignment pins 22 in the end 24 of one clamping ring half mate with corresponding alignment holes 26 in the end 28 of the other clamping ring half to properly align the two clamping ring halves and to prevent the clamping ring halves from being accidentally reversed during the installation procedure. The clamping ring halves are fastened together by bolts 30 inserted into tangential bore 33 and threaded into corresponding threaded holes 31.

The clamping ring 12 mounts to the outer surface of the pipe 20 by adjustable track feet 32, which are radially adjustable by means of adjustment screws 24 (FIG. 5) to fit pipes of different diameters. Thus, it will be appreciated that the clamping ring when mounted to the pipe provides a fixed reference with respect to the workpiece.

Figure 4:
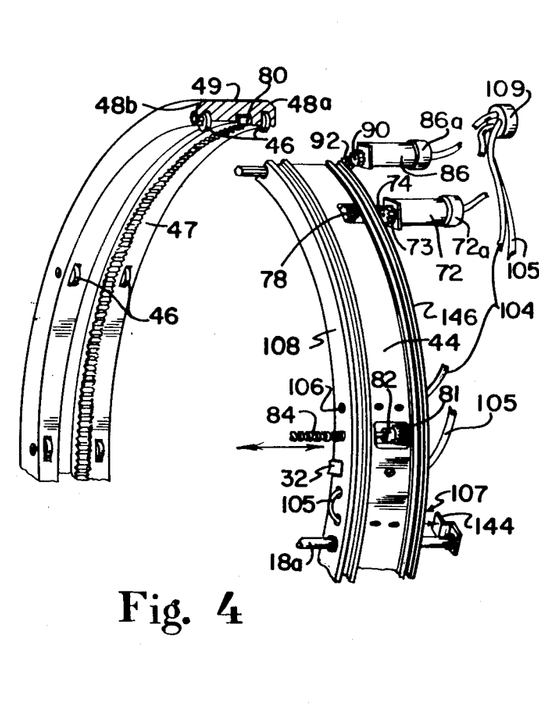
FIG. 4 is a partial cut-away perspective view of a the clamping ring and concentric ring gear of the apparatus of FIG. 1.

Concentric ring gear 13 comprises ring gear halves 13a and 13b which are fitted together around the outer circumference of the clamping ring 12 by alignment pins 36 and alignment holes 38 (FIG. 5) and fastened together by bolts 40 received into the outer surface of the clamping ring half 13a through tangential bore 41 and threaded into a threaded hole in clamping ring half 13b. As shown in FIG. 4, a pair of bearing grooves 42 on the outer surface 44 of the clamping ring 12 receive sealed stainless-steel ball bearings 46 mounted on the inner surface 47 of the concentric ring gear 13, so that the ring gear is supported for rotation about the clamping ring by the ball bearings. As seen in FIG. 1, the edges 48a, 48b of the outer surface 49 of the ring gear are chamfered to avoid sharp edges which might tend to abrade a power cord rubbing against it as the ring gear turns.

Figures 6, 6A, 6B:
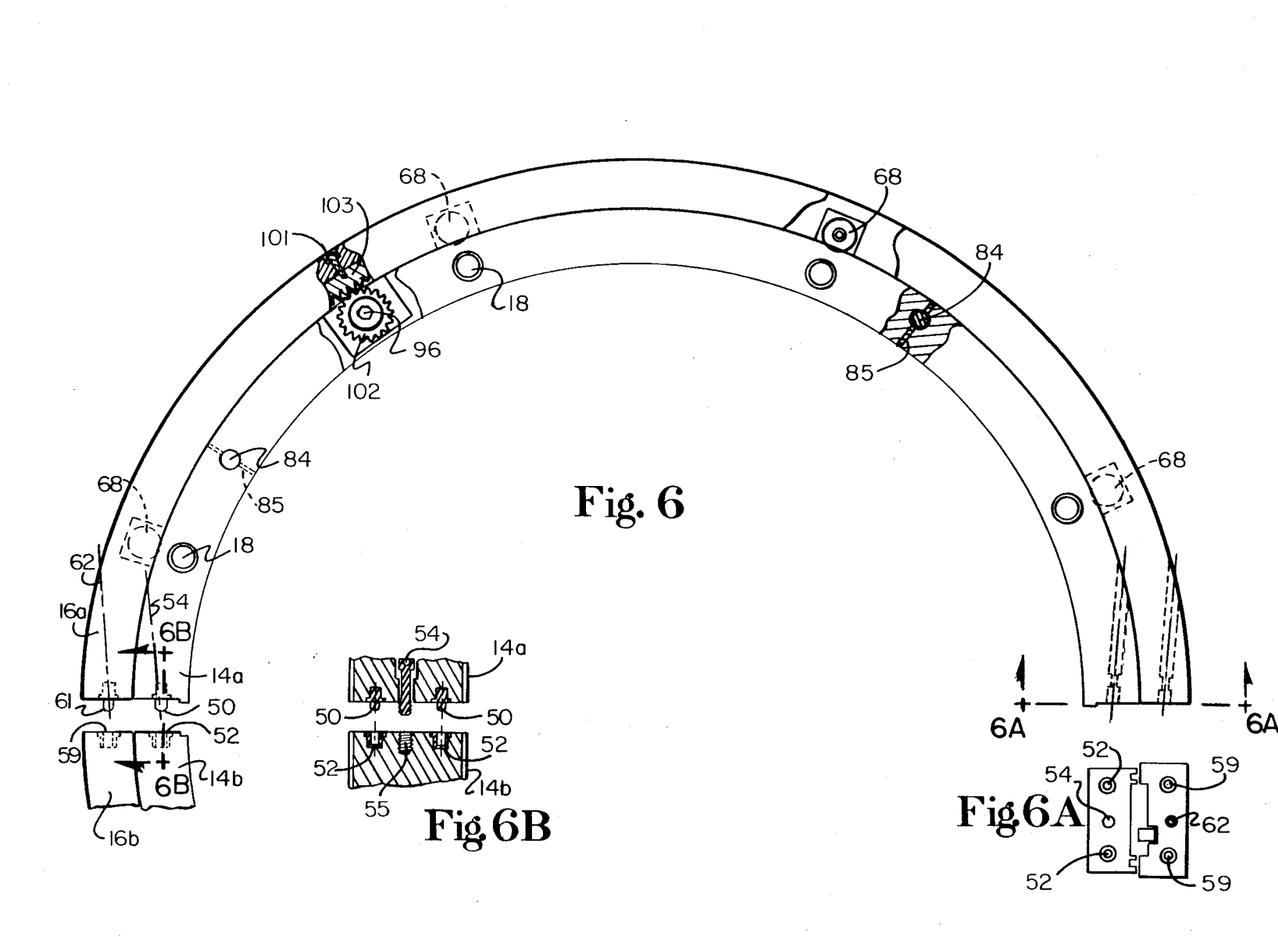
FIG. 6 is a side assembly view of the torch mounting ring half of the embodiment of FIG. 1 in place on an indexing ring half.
FIG. 6A is an end view of the assembly depicted in FIG. 6.
FIG. 6B is a partial cross-sectional view of the assembly depicted in FIG. 6.

The indexing track 14 comprises two indexing track half sections 14a and 14b, which are fitted together around the pipe by alignment pins 50 and mating alignment holes 52 (FIG. 6). The indexing track halves are fastened together by bolts 54 inserted through bore 57 in indexing track half 14a and threaded into mating threaded holes 55 in indexing track half 14b in the manner described above.

The torch mounting ring 16 comprises two mounting ring half sections 16a, 16b which are fitted together around the outer circumference of the indexing track 14 by alignment pins 61 and mating alignment holes 59 and fastened together by bolts 62 inserted through the outer surface of torch mounting ring half 16a and threaded into a corresponding threaded hole in clamping ring half 16b in the manner described above. The top surface 63 of the torch mounting ring provides an advantageous work surface to which a tool 64 may be attached by drilling holes and bolting the tool to the ring, and the squared edges 65a, 65b of the top surface of the mounting ring provide convenient reference lines for aligning the tool.

Figure 2:
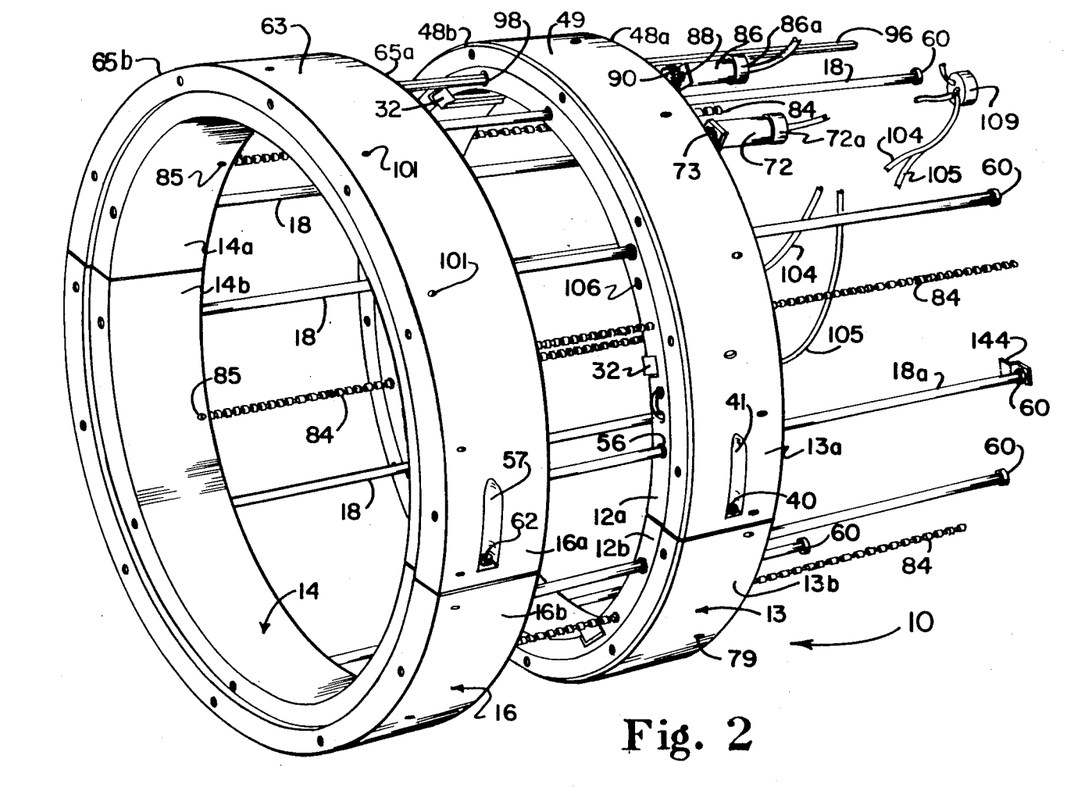
FIG. 2 is a perspective view of the tool positioning apparatus of FIG. 1 in a longitudinally retracted position.

As seen in FIG. 2, a pair of bearing grooves 66 in the outer surface 67 of the indexing track 14 receives sealed stainless-steel ball bearings 68 mounted on the inner surface 70 of the torch mounting ring 16 so that the mounting ring is supported for rotation about the indexing track by the ball bearings.

Referring again to FIG. 1, a plurality of guide rods 18 (eight in the disclosed embodiment) are bolted to the indexing track 14 to extend longitudinally and parallel to the outer surface of the pipe 20. A plurality of corresponding holes 56 equipped with bushings 58 in the clamping ring 12 slidably receive the guide rods, and caps 60 on the ends of the guide rods prevent the rods from being pulled through the holes in the clamping ring. In this manner, the indexing track is supported for longitudinal movement by the guide rods and the fixed clamping ring.

Referring now to FIG. 4, longitudinal movement of the indexing track 14 is provided by an electric motor 72 mounted to the clamping ring 12. The motor turns drive gear 73 which engages an idler gear 74 attached to a shaft 76. Gear 78 on the end of the shaft 76 meshes with a gear rack 80, which is bolted by bolts 79 to the inner surface 58 of the ring gear 13. In turn, the ring gear meshes with gears 81 mounted on each of four ball screw nuts (an exemplary one of which is shown as 82) mounted in the clamping ring 12. Each of the ball screw nuts 82 axially drives a ball screw 84 secured to the indexing track 14 by pins 85 (FIG. 6) to move the indexing track toward and away from the clamping ring.

To provide orbital movement of the torch mounting ring, a second electric motor 86 mounted on the clamping ring 12 drives a shaft 88 (FIG. 5). A gear 90 on the end of the shaft 88 engages a gear 92 mounted on a hex bushing 94, which drives a hexagonal telescoping drive shaft 96 slidably received through a hole 98 in the clamping ring 12. The end 100 of the telescoping drive shaft is received for rotation within the indexing track 14, where a gear 102 on the end of the telescoping drive shaft meshes with a gear rack 103 bolted by bolts 101 to the inner surface 70 of the torch mounting ring 16. In this manner, orbital movement of the torch mounting ring around the indexing track is provided.

Figure 3:
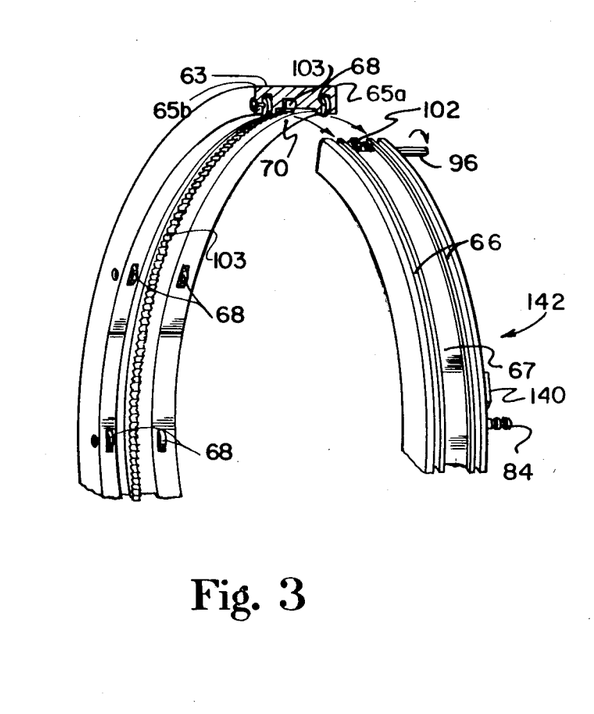
FIG. 3 is a partial cut-away perspective view of the indexing track and torch mounting ring of the apparatus of FIG. 1.

Referring now to FIGS. 3 and 4, a pair of proximity switches 106, 107 mounted inside the clamping ring 12 are connected to a controller (not shown) by wires 104, 105 hooked into a connector 109. Proximity switch 106 is disposed in the inside face 108 of the clamping ring, and proximity switch 107 is disposed in the outside face 146 of the clamping ring. A stainless steel actuator plate 140 is fastened to the inside face 142 of the indexing track in a position to actuate proximity switch 106 when the indexing track 14 is moved toward the clamping ring 12. L-shaped actuator plate 144 is fastened to the end of a guide rod 18 to actuate proximity switch 107 when the indexing track is moved away from the clamping ring, bringing the end of the guide rod toward the clamping ring.

In the preferred embodiment, each of the proximity switches 106 and 107 is embodied by an oscillator having a coil as one of the frequency determining elements. The inductance of the coil is altered when one of the actuator plates 140 or 144 approaches the coil, causing the oscillator to change frequency. Detection of this change provides an output signal to the controller indicating approach of the plates. It will be appreciated that proximity switch 106 is actuated by the approach of actuator plate 140 on the indexing track 14, and that proximity switch 107 is actuated by the approach of actuator plate 144 on the end of a guide rod 18a. Thus, the proximity switches perform the function of limit switches to define the limits of movement of the indexing track.

The electric motors 72, 86 comprise double shafts, the aforementioned drive shafts 76, 88 extending from one end of the motors, and coaxial secondary shafts (not shown) extending from the opposite ends of the motors within housings 72a, 86a. These secondary shafts drive optical position encoders which provide signals to electronic control circuitry known to the art so that the longitudinal and circumferential position of the tool with respect to the surface of the pipe is known at all times from the history of the rotation of the motors.

The clamping ring 12, concentric ring gear 13, indexing track 14, and torch mounting ring 16 are prefereably manufactured from aluminum for high strength and light weight. However, as known to those skilled in the art, threads bored in aluminum have a propensity to disfigure or strip under heavy or repeated use. Thus, it will be understood that throughout the design of this embodiment, whenever it is necessary to provide a threaded hole in an aluminum element for securing bolts and the like, a smooth bore is drilled into the aluminum element and threads are cut into the sides of the bore. A steel helicoil is then twisted into the threads of the bore to provide a threaded hole with steel threads and correspondingly high strength.

To install the tool positioning apparatus 10 of the present invention on a typical workpiece pipe 20, clamping ring half 12a and indexing track half 14a, connected by the guide rods 18 bolted to indexing track half 14a, are fitted to clamping ring half 12b and indexing track half 14b, connected by the guide rods bolted to indexing track half 14b, in position around the pipe proximate to the area of the pipe upon which work is desired to be done. Alignment pins 22 on one clamping ring half are mated with alignment holes 26 in the other ring half, and the ring halves are then fastened together by bolts 30 to form a unitary clamping ring structure 12. Track feet 32 are radially adjusted by turning adjustment screws 34 so that the track feet bear against the surface of the pipe 20 to secure the clamping ring in place. Similarly, alignment pins in one indexing track half are mated with alignment holes in the other indexing track half, and the track halves are fastened together by bolts to form a unitary indexing track structure. When installed in this manner, the indexing track 14 is positioned in coaxial, spaced apart relation to the pins 20 and is supported for longitudinal movement upon the guide rods 18.

The concentric ring gear halves 13a, 13b are fitted together around the installed clamping ring 12 by alignment pins and corresponding alignment holes and fastened together by bolts, as described above, to form a unitary concentric ring gear structure 13. Ball bearings 46 in the inner surface 47 of the ring gear are received into the corresponding bearing grooves 42 in the outer surface 44 of the clamping ring, so that the bearings support the ring gear for orbital movement about the clamping ring. When installed as herein described, the gear track 80 on the inner surface 47 of the concentric ring gear 13 is engaged by the motordriven gear 78 and in turn drives the ball screw nuts 82 which reciprocate the four ball screws 84 engaged thereby.

Finally, the torch mounting ring halves 16a, 16b are fitted together and fastened around the indexing track 14 in the manner described above to form a unitary torch mounting ring structure 16. Ball bearings 68 mounted in the inner surface 70 of the torch mounting ring are received into the corresponding bearing grooves 66 in the outer surface 67 of the indexing track 14 so that the bearings support the torch mounting ring for orbital movement about the indexing track. When installed in this manner, the gear rack 103 on the inner surface 70 of the torch mounting ring 16 engages the gear 102 on the end of the motor-driven telescoping drive shaft 96.

In operation, to achieve longitudinal positioning of the tool with respect to the surface of the pipe, electric motor 72 is activated to drive the idler gear 74 which turns the shaft 76. The gear 78 on the end of the shaft engages the gear rack 80 on the concentric ring gear 13, causing the concentric ring gear to rotate around the clamping ring. As the ring gear turns, the gear rack drives the ball screw nuts 82, causing the ball screws 84 to reciprocating, thereby moving the attached indexing track 14 toward or away from the clamping ring 12 on the support rods 18.

As the indexing track moves toward the clamping ring, the support rods are projected through the holes 56 in the clamping ring, as shown in FIG. 2. Similarly, the telescoping drive shaft 96 "telescopes" through the hole 98 in the clamping ring as the indexing track moves toward the clamping ring.

Minimum separation of the indexing track from the clamping track is limited to prevent the indexing track from banging into the clamping ring. Proximity switch 106, mounted in the inside face 108 of the clamping ring, detects actuator plate 140 in the inside face 142 of the indexing track as the indexing track nears the clamping ring and sends a signal along wire 104 to the controller to shut off the electric motor 72. In a similar manner, the maximum separation of the indexing track from the clamping ring is limited to prevent the indexing track from being moved too far away from the clamping ring and becoming disengaged. Proximity switch 107 in the outside face 109 of the clamping ring detects actuator plate 144 on the end of guide rod 18a as the indexing track is moved away from the clamping ring, bringing the end of the guide rod 18a toward the clamping ring. When the switching is activated, it sends a signal to the controller along wire 105 to shut off the electric motor. Additionally, the indexing track is mechanically prevented form becoming longitudinally disengaged from the clamping ring by caps 60 rigidly secured on the ends of the support rods, which prevent the rods from being pulled through the holes in the clamping ring.

To achieve orbital positioning of the tool on the tool mounting ring with respect to the surface of the pipe, the second electric motor 86 is activated to turn the drive shaft 88. The gear 90 on the end of the drive shaft engages a gear 92 on the end of the hex bushing 94, thereby turning the telescoping drive shaft 96. At the other end 100 of the telescoping drive shaft, gear 102 engages the gear rack 103 on the torch mounting ring 16, thereby turning the torch mounting ring and the tool mounted thereon.

Figure 7:
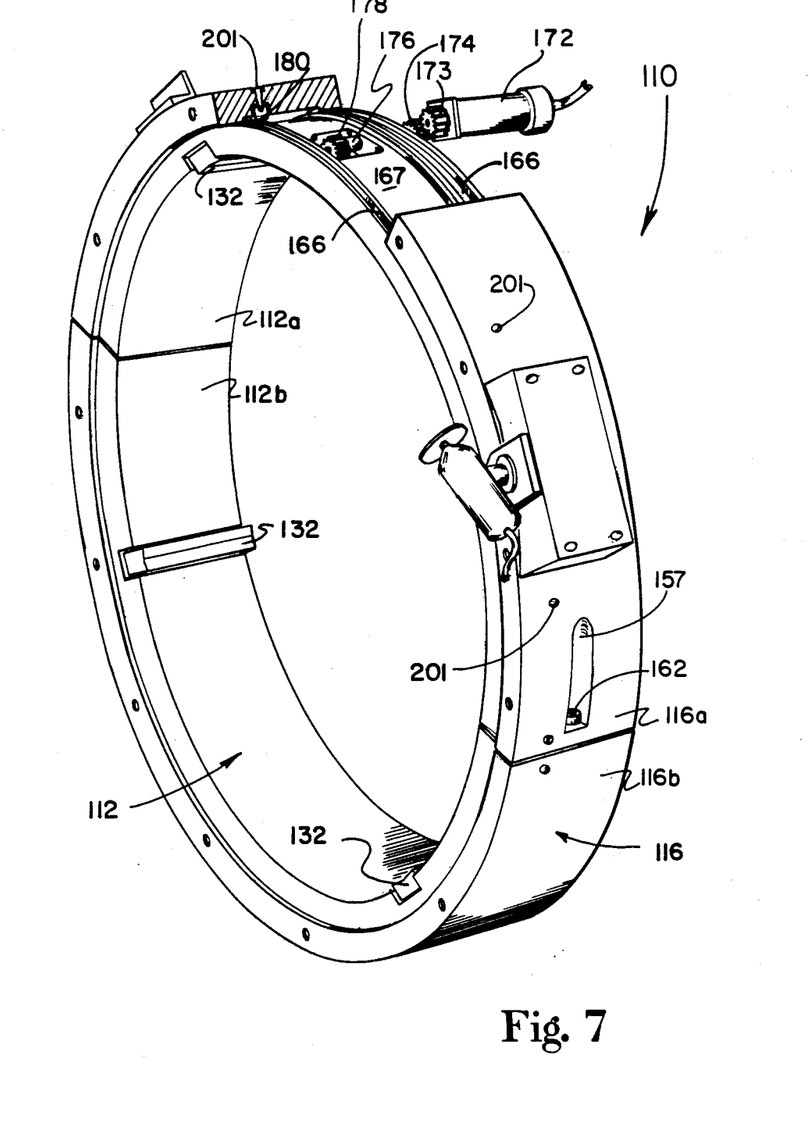
FIG. 7 is a partially cut-away perspective view of an alternate embodiment of the tool positioning apparatus.

FIG. 7 shows an alternate embodiment of a tool positioning apparatus 110 providing only for orbital positioning of the tool with respect to a workpiece pipe. A clamping ring 112 comprises clamping ring halves 112a, 112b which are fitted together to form a unitary structure. Alignment pins in the end of one ring half mate with corresponding alignment holes (not shown) in the other ring half to properly align the two ring halves and to prevent the ring halves from being accidentally reversed during the installation procedure. The ring halves are then fastened together by bolts and corresponding threaded holes (not shown) in the same manner shown for clamping ring 12 of the preferred embodiment. The clamping ring 112 mounts to the outer surface of a pipe by adjustable track feet 132, which are radially adjustable by means of adjustment screws to fit pipes of different diameters.

The torch mounting ring 116 comprises two half-ring sections 116a, 116b which are fitted together around the clamping ring 112 by alignment pins and corresponding alignment holes (not shown). The ring sections are fastened together by bolts 162 inserted into bore 157 in torch mounting ring half 116a and threaded into a corresponding threaded hole (not shown) in torch mounting ring half 116b. A pair of bearing grooves 166 in the outer surface 167 of the clamping ring receive sealed stainless-steel ball bearings (not shown) mounted on the inner surface of the torch mounting ring 116 so that the mounting ring is supported for rotation about the clamping ring by the ball bearings.

To provide for orbital movement of the torch mounting ring, an electric motor 172 mounted to the clamping ring 112 turns a drive gear 173 which engages an idler gear 174 attached to a drive shaft 176. A gear 178 on the end of the shaft 176 meshes with the gear rack 180 bolted by bolts 201 to the inner surface 158 of the torch mounting ring 116. In this manner, orbital movement of the torch mounting ring around the clamping ring is provided. As explained above, optical position encoders (not shown) associated with the electric motor keep track of the position of the tool with respect to the pipe.

To install this alternate embodiment of the tool positioning apparatus 110, clamping ring halves 112a, 112b are fitted in position around the pipe proximate to the area of the pipe upon which work is desired to be done. Alignment pins 122 on one ring half are mated with alignment holes 126 in the other ring half, and the ring halves are then fastened together by bolts 130 to form a unitary clamping ring structure 112. Track feet 132 are radially adjusted by turning adjustment screws 134 to bear against the surface of the pipe to secure the clamping ring in place.

The torch mounting ring halves 116a, 116b are then fitted together around the clamping ring 112. Alignment pins 160 in one torch mounting ring half are mated with corresponding alignment holes 161 in the other ring half, and the torch mounting ring halves are fastened together by bolts 162 to form a unitary torch mounting ring structure 116. Ball bearings 168 mounted in the inner surface 170 of the torch mounting ring are received into the corresponding bearing grooves 142 in the outer surface 144 of the clamping ring 114 so that the bearings support the torch mounting ring for orbital movement about the clamping ring. When installed in this manner, the gear rack 180 on the inner surface 170 of the torch mounting ring 116 engages the gear 178 on the end of the motor-driven drive shaft 176.

To operate the orbital tool positioning apparatus 110, electric motor 172 is activated to drive the idler gear 174 which turns the shaft 176. The gear 178 on the end of the shaft engages the gear rack 204 on the torch mounting ring 116, thereby turning the torch mounting ring and the tool mounted thereon.

It will be appreciated by those skilled in the art that the optical position encoders associated with the electric motors, in conjunction with control circuitry known in the art, can maintain track of the position of the tool at all times with respect to the surface of the pipe. It will further be appreciated that the tool positioning apparatus of the present invention may be controlled by a computer to index the tool in a predetermined pattern; or, with the aid of a television camera or other sensing device mounted to the torch mounting ring, may be operated manually be remote control.

It will also be recognized that a wide variety of tools may be used in conjunction with this invention, including a welding head in conjunction with a welding wire spool and welding wire feed motor assembly to feed welding wire to the point of the weld; a pneumatic grinder for grinding off rough spots on the pipe or on a weld; a cutting torch; an X-ray machine or other inspection device to inspect a pipe for possible cracks or failures; or a painting attachment. Other applications will be apparent to those skilled in the art without departing from the scope or spirit of the appended claims.

Those skilled in the art will appreciate that, while the disclosed embodiment has been described with respect to a pipe, the apparatus of the present invention can be adapted to a variety of workpieces, for example a rectangular duct.

It will be appreciated that an embodiment of the tool positioning apparatus for providing only longitudinal positioning of a tool with respect to a pipe can be achieved by provding an embodiment similar to tool positioning apparatus 10 with the tool mounted directly onto the indexing ring and completely eliminating the torch mounting ring and related drive train.

Finally, it will be understood that the preferred embodiment of the present invention has been disclosed by way of example, and that other modifications may occur to those skilled in the art without departing from the scope and spirit of the appended claims.

What is claimed is:

1. An apparatus for positioning a tool with respect to the outer surface of an elongate workpiece, comprising:
   a first reference means selectively mountable with respect to the outer surface of said workpiece for establishing a fixed reference with respect to the surface of said workpiece;
   a second support means mounted to said first reference means for longitudinal movement with respect to said workpiece surface; and
   a third orbital means attached to said second support means and longitudinally moveable therewith for providing circumferential movement with respect to said workpiece surface,
   whereby a tool mounted to said third orbital means is positionable both longitudinally and circumferentially with respect to said workpiece surface.

2. An apparatus for positioning a tool with respect to an elongate cylindrical workpiece, comprising:
   a selectively positionable first annular member for mounting to the outer surface of a workpiece;
   a longitudinally moveable second annular member fitted around the workpiece;
   means operably associated with said first member for supporting said second member for translational movement longitudinally with respect to the workpiece;
   a third annular member fitted around said second member and mounted on said second member for orbital movement with respect thereto; and
   means on said orbitally moveable third member for mounting the tool,
   whereby said tool is longitudinally and circumferentially moveable with respect to the workpiece.

3. The apparatus of claim 2, further comprising motor means for driving said second member for translational movement longitudinally with respect to the workpiece.

4. The apparatus of claim 3, wherein said motor means comprises a first motor means, and further comprising a second motor means for driving said third member for orbital movement with respect to said second member.

5. The apparatus of claim 4, further comprising a plurality of optical position encoders associated with said first and second motor means.

6. The apparatus of claim 2, wherein said supporting means comprises a plurality of support rods operatively associated with said selectively positionable first member and extending longitudinally and parallel to the outer surface of the workpiece, said second member being supported by said plurality of support rods for longitudinal movement.

7. An apparatus for positioning a tool with respect to the surface of an elongate workpiece, comprising:
   a reference means selectively positionable with respect to said workpiece for establishing a reference with respect to said workpiece;
   a longitudinal support means attached to said reference means and longitudinally movable with respect thereto for supporting a tool for longitudinal movement across said workpiece at a fixed distance from the surfce of said workpiece;
   an orbital support means attached to said longitudinal support means and longitudinally moveable therewith for supporting a tool for circumferential movement with respect to said workpiece surface; and
   motor means for providing longitudinal movement for said longitudinal support means and for providing circumferential movement of said orbital support means with respect to said workpiece,
   whereby a tool mounted to said orbital support means is longitudinally and circumferentially positionable with respect to said workpiece surface.

8. An apparatus for positioning a tool with respect to an elongate workpiece, comprising:
   a first member selectively mountable on the outer surface of said workpiece and axially positionable with respect thereto for providing a fixed reference with respect to said workpiece;
   a second member selectively moveable with respect to said first member;
   support means attached to said first member for supporting said second member for translational longitudinal movement with respect to said workpiece; and
   a third member supported by said second member for circumferential movement around said workpiece, said third member being longitudinally movable along with said second member,
   whereby a tool mounted to said third member is both longitudinally and circumferentially positionable with respect to said workpiece surface.

* * * * *